United States Patent
Nagaraj et al.

(10) Patent No.: US 7,996,710 B2
(45) Date of Patent: Aug. 9, 2011

(54) DEFECT MANAGEMENT FOR A SEMICONDUCTOR MEMORY SYSTEM

(75) Inventors: Dheemanth Nagaraj, Longmont, CO (US); Larry J. Thayer, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 675 days.

(21) Appl. No.: 11/740,052

(22) Filed: Apr. 25, 2007

(65) Prior Publication Data
US 2008/0270675 A1 Oct. 30, 2008

(51) Int. Cl.
*G06F 11/00* (2006.01)
(52) U.S. Cl. .................... 714/6.1; 714/6.32; 711/100
(58) Field of Classification Search ............... 714/7, 6.1, 714/6.32; 711/100
See application file for complete search history.

(56) References Cited

U.S. PATENT DOCUMENTS

| | | | |
|---|---|---|---|
| 5,235,585 A * | 8/1993 | Bish et al. .................. 369/53.17 |
| 5,278,847 A | 1/1994 | Helbig, Sr. et al. |
| 5,406,565 A | 4/1995 | MacDonald |
| 6,081,463 A | 6/2000 | Shaffer et al. |
| 6,163,490 A | 12/2000 | Shaffer et al. |
| 6,260,156 B1 | 7/2001 | Garvin et al. |
| 6,408,401 B1 * | 6/2002 | Bhavsar et al. .................... 714/7 |
| 6,581,167 B1 * | 6/2003 | Gotoh et al. ....................... 714/7 |
| 7,009,896 B2 | 3/2006 | Yoon et al. |
| 7,142,471 B2 | 11/2006 | Fasoli et al. |
| 7,277,307 B1 * | 10/2007 | Yelluru ........................ 365/49.1 |
| 7,447,943 B2 * | 11/2008 | Vu et al. .......................... 714/42 |
| 7,620,766 B1 * | 11/2009 | Waldspurger ..................... 711/6 |
| 2001/0039601 A1 | 11/2001 | Leung et al. |
| 2002/0122337 A1 * | 9/2002 | Kanazawa et al. ........ 365/189.12 |
| 2003/0112675 A1 * | 6/2003 | Mukai et al. ................... 365/200 |
| 2004/0196707 A1 | 10/2004 | Yoon et al. |
| 2004/0228240 A1 * | 11/2004 | Chiang ....................... 369/47.14 |
| 2005/0132128 A1 | 6/2005 | Lee |
| 2005/0162947 A1 * | 7/2005 | Kim et al. ..................... 365/200 |
| 2005/0270829 A1 * | 12/2005 | Ooishi .......................... 365/158 |
| 2006/0018166 A1 * | 1/2006 | Iaculo et al. .................. 365/200 |
| 2006/0036827 A1 * | 2/2006 | Dell et al. ..................... 711/167 |
| 2006/0109725 A1 | 5/2006 | Yoon et al. |
| 2006/0179206 A1 * | 8/2006 | Brittain et al. .................... 711/5 |
| 2006/0221728 A1 | 10/2006 | Fasoli et al. |
| 2007/0058471 A1 * | 3/2007 | Rajan et al. ................... 365/222 |

(Continued)

OTHER PUBLICATIONS

Craig Szydlowski; Tips for Using RAS Features for Storage Systems; Computerworld Storage; Aug. 11, 2005; 3 pages; http://www.computerworld.com/hardwaretopics/storage/story/0,10801,103821,00.html.

*Primary Examiner* — Scott T Baderman
*Assistant Examiner* — Loan Truong (57) ABSTRACT

A method is provided for managing defects in a semiconductor memory system having a plurality of addressable locations. In the method, a first plurality of the addressable locations is allocated as in-use locations, and a second plurality of the addressable locations is allocated as spare locations. A plurality of sets of the in-use locations, wherein each of the sets is associated with a memory defect, is determined. At least one of the sets includes a different number of in-use locations than another of the sets. Each of the sets of the in-use locations is associated with at least one corresponding set of the spare locations. Each of a plurality of data requests that is associated with one of the sets of the in-use locations is directed to the at least one corresponding set of the spare locations.

22 Claims, 8 Drawing Sheets

U.S. PATENT DOCUMENTS

| | | |
|---|---|---|
| 2007/0162791 A1* | 7/2007 | Gotoh et al. ................. 714/710 |
| 2008/0077840 A1* | 3/2008 | Shaw et al. ................... 714/763 |
| 2008/0163032 A1* | 7/2008 | Lastras-Montano .......... 714/785 |
| 2008/0168329 A1* | 7/2008 | Han et al. ..................... 714/764 |
| 2008/0181021 A1* | 7/2008 | Thayer .................... 365/189.02 |
| 2008/0222449 A1* | 9/2008 | Ramgarajan et al. ............. 714/6 |

* cited by examiner

DEFECT MANAGEMENT FOR A SEMICONDUCTOR MEMORY SYSTEM

BACKGROUND OF THE INVENTION

A vital component of virtually all computer systems is a semiconductor or solid-state memory system. The memory system often holds both the programming instructions for a processor of the computer system, as well as the data upon which those instructions are executed. In one example, the memory system may include one or more dual in-line memory modules (DIMMs), with each DIMM carrying multiple dynamic random access memory (DRAM) integrated circuits (ICs). Other memory technologies, such as static random access memories (SRAMs), and various memory organizational structures, such as single in-line memory modules (SIMMs), are also employed in a variety of computer systems. In addition, one or more processors may be coupled with the memory modules through a memory controller, which translates data requests from the processor into accesses to the data held in the memory modules. In addition, many systems provide one or more levels of cache memory residing between the memory modules and the memory controller to facilitate faster access for often-requested data.

Computer systems have benefited from the ongoing advances made in both the speed and capacity of memory devices, such as DRAMs, employed in memory systems today. However, increasing memory data error rates often accompany these advancements. More specifically, both "hard errors" (permanent defects in a memory device, such as one or more defective memory cells) and "soft errors" (data errors of a temporary nature, such as inversion of data held within one or more memory cells) tend to become more prevalent with each new technology generation. To combat these errors, memory controllers in commercial computer systems now commonly support an error detection and correction (EDC) scheme in which redundant EDC data is stored along with the customer, or "payload," data. When these data are then read from the memory, the memory controller processes the EDC data and the payload data in an effort to detect and correct at least one data error in the data. The number of errors that may be detected or corrected depend in part on the power of the EDC scheme utilized, as well as the amount of EDC data employed compared to the amount of payload data being protected. Typically, the more EDC data being utilized, the higher the number of errors capable of being detected and corrected, but also the higher the amount of memory capacity overhead incurred.

More advanced memory controllers supplement their EDC scheme with a "chipkill" capability, in which the data within an entire memory device, such as a DRAM, may be ignored, or "erased," and then recreated using the EDC data. Such capability allows an entire device to be fail while maintaining the capability to fully recover the data. Further, some memory systems may also provide one or more spare memory devices to be used as replacements for other failing memory devices. However, similar to the use of EDC, the use of spare devices also increases the cost and memory overhead associated with the memory system. Other systems may supply a spare DIMM for replacing an entire in-use DIMM that includes one or more memory defects affecting large portions of the DIMM. In yet another example, the memory controller itself may include a small amount of storage to replace one or more defective cache "lines" of data stored in the memory devices. In other implementations, computer system firmware may report a defect detected by the EDC scheme to an operating system (OS), which may then deallocate one or more constant-sized OS-level "pages" of memory containing the defect.

Even with these advanced memory protection mechanisms, further memory technological advances often involve attendant increases in hard and soft error rates, thus reducing device reliability. Also, new memory device generations often introduce new memory failure modes. For example, memory defects previously causing one or two memory cells to fail may instead affect four or eight memory cells. Thus, such advances in memory technology may have the unintended effect of reducing the effectiveness of the EDC and related schemes currently employed in computer memory systems.

DETAILED DESCRIPTION OF THE INVENTION

Figure 1:
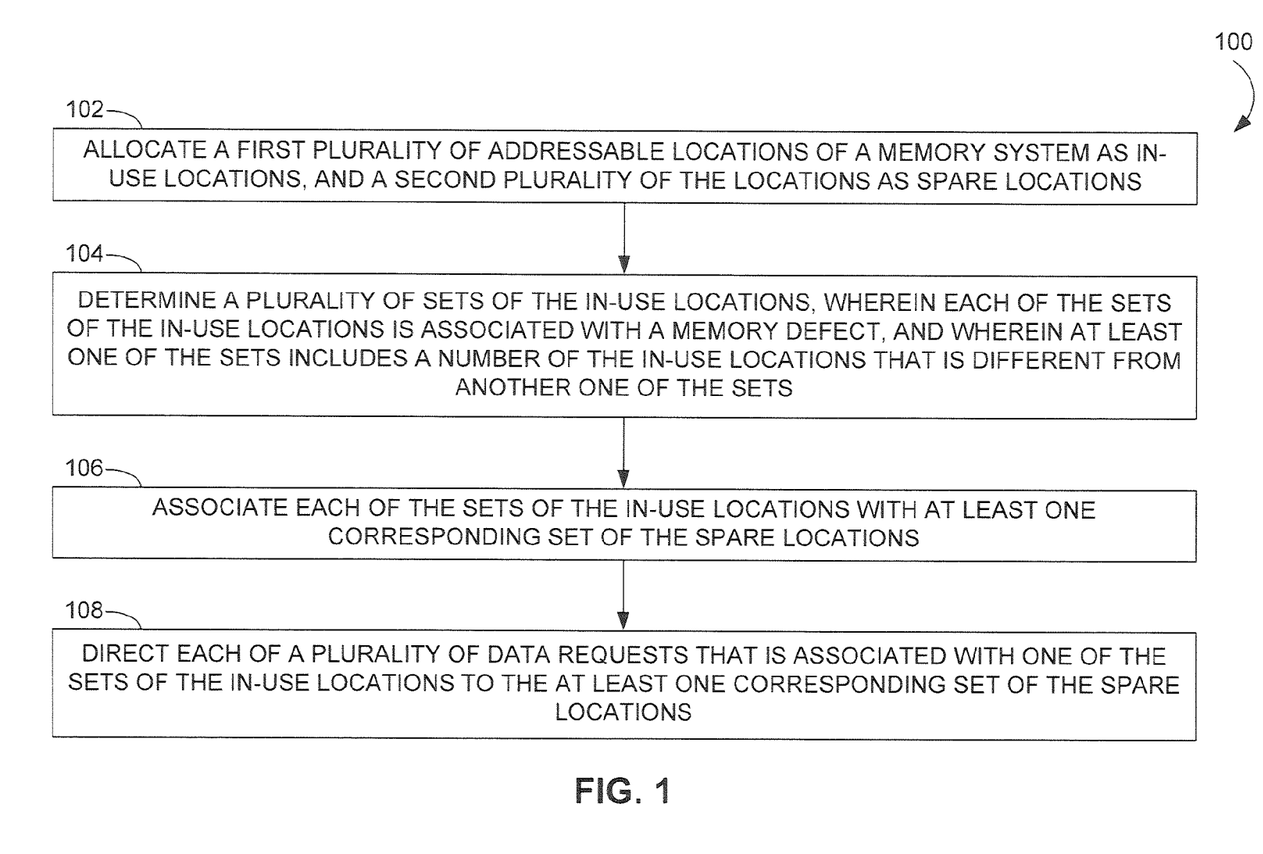
FIG. 1 is a flow diagram of a method according to an embodiment of the invention for managing defects in a semiconductor memory system.

FIG. 1 provides a flow diagram of a method 100 according to an embodiment of the invention for managing memory defects in a semiconductor memory system. A memory defect may be any defect of the semiconductor memory system that causes hard or soft errors affecting data stored within the memory system. In the method 100, addressable locations within the memory system are allocated into a first plurality of locations as in-use locations, and a second plurality of locations as spare locations (operation 102). A plurality of sets of the in-use locations, wherein each of the sets of the in-use locations is associated with a memory defect, is determined (operation 104). At least one of the sets includes a different number of the in-use locations than another one of the sets. Each of the sets of the in-use locations is then associated with at least one corresponding set of the spare locations (operation 106). Each of a plurality of data requests that is associated with one of the sets of the in-use locations is directed to the at least one corresponding set of the spare locations (operation 108).

Figure 2:
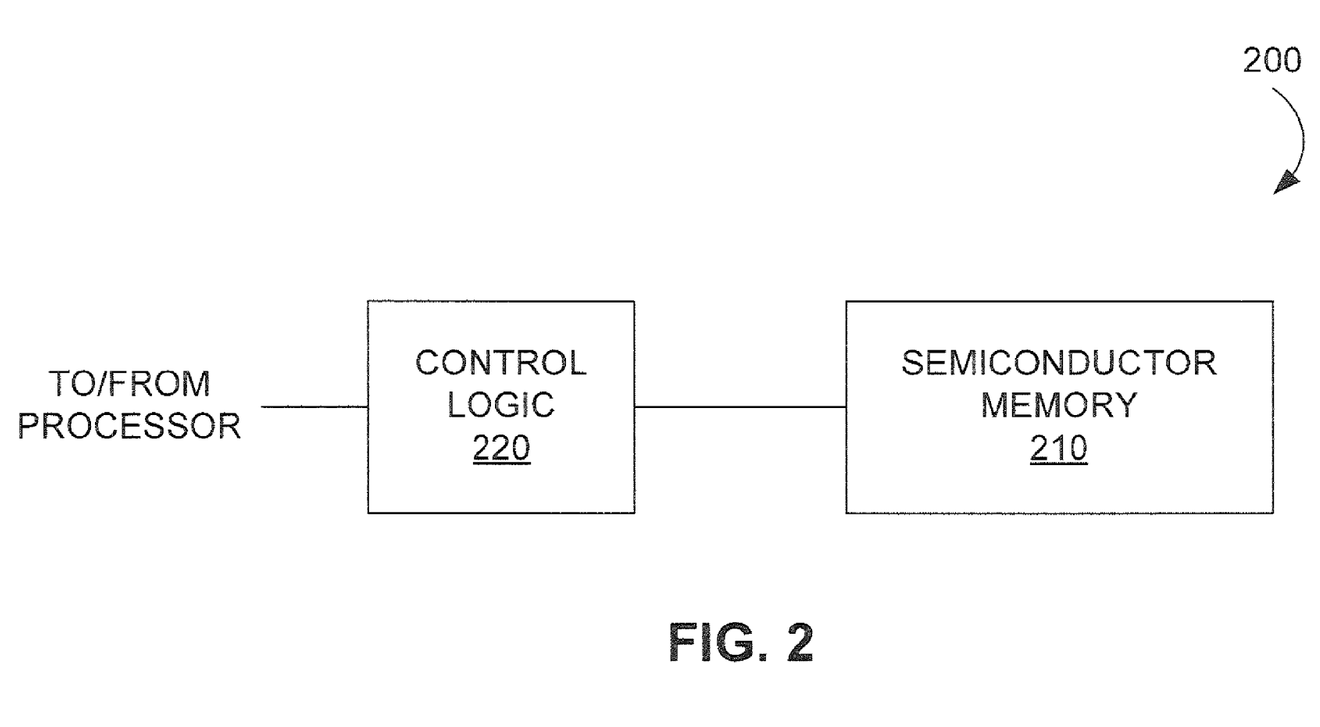
FIG. 2 is a block diagram of a semiconductor memory system according to an embodiment of the invention.

A semiconductor memory system 200 according to another embodiment of the invention is depicted in FIG. 2. The system 200 includes a semiconductor memory 210 coupled with control logic 220. The semiconductor memory 210 includes a plurality of addressable memory locations. The control logic 220 is configured to allocate a first plurality of the addressable locations as in-use locations and a second plurality of the addressable locations as spare locations. The control logic 220 is also configured to determine a plurality of sets of the in-use locations, wherein each of the sets of the in-use locations is associated with a memory defect. Also, at least one of the sets includes a different number of the in-use locations than another of the sets. Further, the control logic 220 is configured to associate each of the sets of the in-use locations with at least one corresponding set of the spare locations. The control logic 220 is also configured to direct each of a plurality of data requests that is associated with one of the sets of the in-use locations to the at least one corresponding set of the spare locations. In one embodiment, the control logic 220 receives these data requests from a processor of a computer system within which the semiconductor memory system 200 is located. Also, the control logic 220 may take the form of hardware implemented on a memory controller or other IC device, firmware executable by a processor of the computer system, or some combination thereof.

Figure 3:
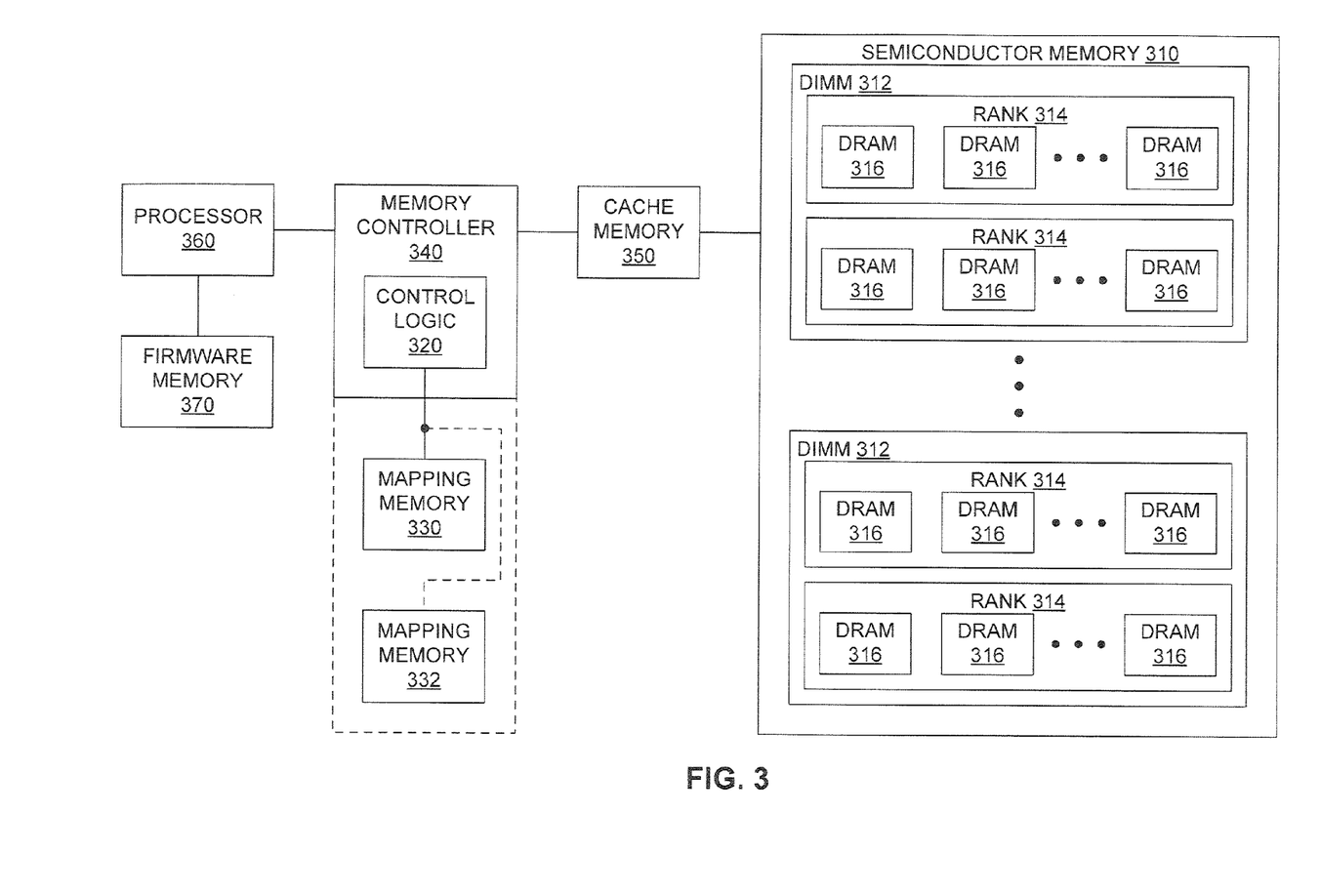
FIG. 3 is a block diagram of a semiconductor memory system according to another embodiment of the invention residing within a computer system.

A particular semiconductor memory system 300 according to another embodiment of the invention is illustrated in FIG. 3. The system 300 includes a semiconductor memory 310, control logic 320 coupled with the semiconductor memory 310, and a mapping memory 330 coupled with the control logic 320. In one embodiment, the control logic 320 resides within a memory controller 340. The mapping memory 330 may also reside within the memory controller 340. In another implementation, the mapping memory 330 may be located outside of the memory controller 340, such as in a separate IC on a printed circuit board (PCB) shared with the memory controller 340, or on a separate PCB, such as a DIMM or other memory module. In addition, at least one cache memory 350 may be coupled to, and located between, the semiconductor memory 310 and the memory controller 340, although embodiments not employing a cache memory are also possible. Also, a processor 360 may be coupled with the memory system 300 at the memory controller 340, and with a firmware memory 370 containing firmware that the processor 360 may execute. As will be described in greater detail below, the firmware, when executed on the processor 360, may work in conjunction with the control logic 320 to provide the memory defect management capabilities described herein.

The semiconductor memory 310 of FIG. 3 includes multiple DIMMs 312, with each DIMM 312 containing multiple DRAMs 316. In other embodiments, other memory modules or structures, such as SIMMs, may used. Also, memory technologies other than DRAMs, such as SRAMs, may be employed in other implementations. Many different variations of DRAMs, such as dual data rate (DDR) and extended data out (EDO) DRAMs, may be utilized in other situations. Newer DIMM architectures, such as fully-buffered DIMMs (FB-DIMMs) may be utilized as well. In the particular embodiment of FIG. 3, the DRAMs 316 of each DIMM 312 are organized into two "ranks" 314, or separately addressable portions of the semiconductor memory 310, although other embodiments may utilize a single rank per DIMM 312, or more than two ranks per DIMM 312. Each rank 314 includes several DRAMs 316, with each DRAM 316 providing a number of binary digits, or "bits," for each addressable location, or "word," of the corresponding rank 314.

In one example, each of the DRAMs 316 may be a four-bit wide, or "x4," DRAM, indicating that each DRAM 316 contributes four bits to each data word of the rank 314 in which the DRAM 316 resides. Continuing with this example, each rank 314 may include eighteen DRAMs 316 for a total of 72 bits of data for each word. In one system, the 72 bits may be further allocated into 64 payload bits and 8 EDC bits to facilitate error detection and correction of each word by the memory controller 340. In another embodiment, nine x8 DRAMs 316 per rank 314 would provide the same number of bits per word. Many other memory configurations may be employed as well in various embodiments of the invention.

Given the continually increasing capacities of DRAMs, and the increasing number and scope of memory defects with which they are commonly associated, even the most powerful EDC schemes available may not be able to correct all data errors typically associated with the defects. Additionally, defective memory modules exhibiting even correctable errors should be replaced shortly after such errors are detected to prevent uncorrectable errors due to additional memory defects occurring. In addition, depending on the nature of the defect, many individual memory bits or cells belonging to a particular part of the DRAM may be affected. For example, due to its internal physical organization, a DRAM is often organized as one or more "banks," with each bank having memory locations organized along "rows" and "columns." As a result, each memory defect in a DRAM may affect one or more cells, rows, columns, or banks of the DRAM.

Thus, rather than relying solely on error correction and chipkill schemes to ameliorate these defects, various embodiments of the invention, described in greater detail below, allow the relocation of data from areas of memory affected by a defect to other areas where such defects have not been detected or experienced. Given the use of the cache memory 350 in FIG. 3, the semiconductor memory 310 may be accessed along "cache lines," each of which represents the minimum quantum of data that is read from the semiconductor memory 310 by the cache memory 350. Each cache line typically includes multiple (such as 32, 64 or 128) memory words, each of which would otherwise be individually addressable. The examples discussed below assume access to the semiconductor memory 310 according to cache lines, although other systems may access memory by way of each individual addressable location.

Figure 4:
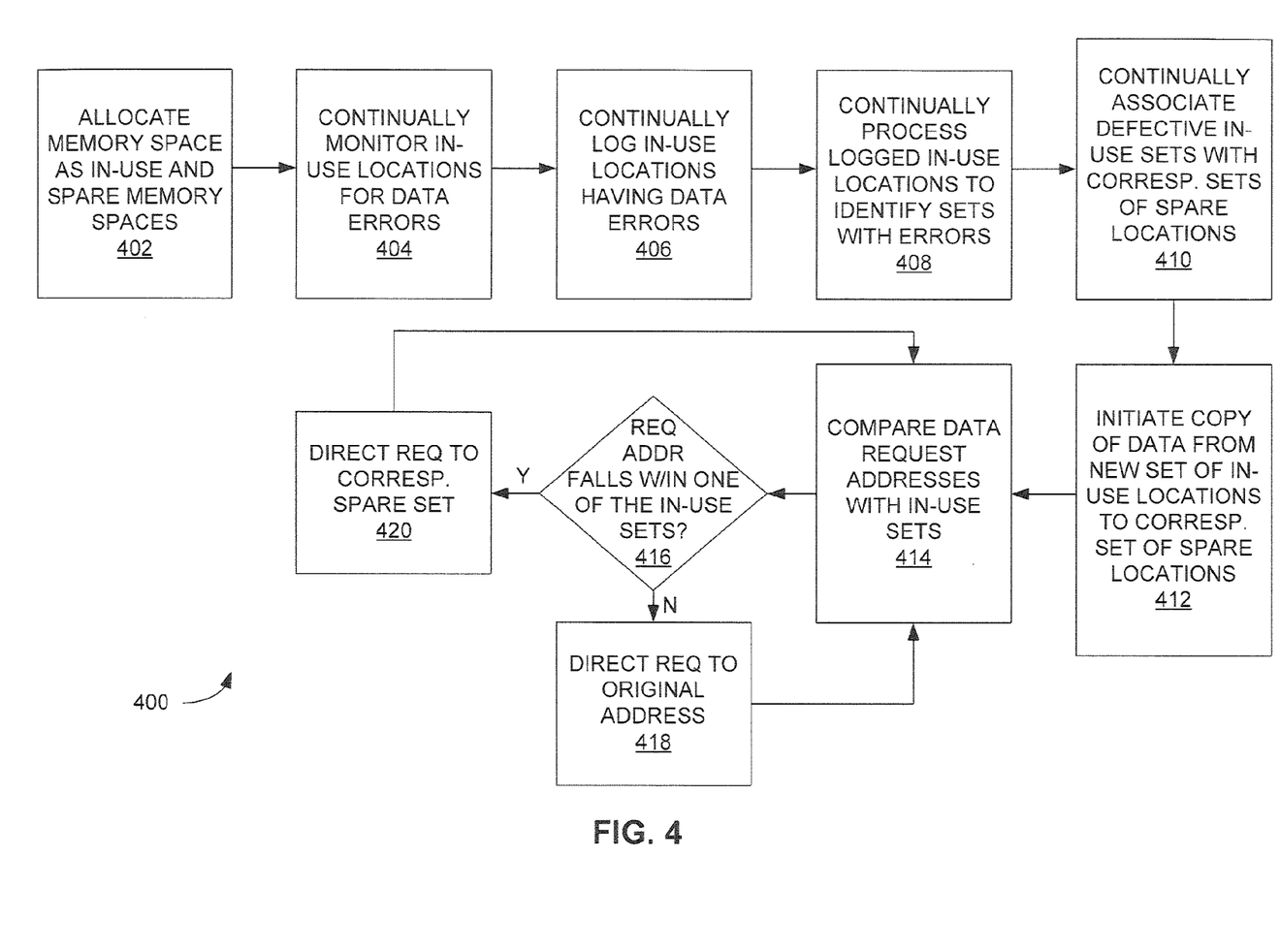
FIG. 4 is a flow diagram of a method according to another embodiment of the invention for managing defects in the semiconductor memory system of FIG. 3.

FIG. 4 provides a flow diagram of a method for managing defects in a semiconductor memory system as employed in the semiconductor memory system 300 presented in FIG. 3 by way of the control logic 320 (in conjunction with the firmware of the firmware memory 370 as executed by the processor 360) and the mapping memory 330 provided therein.

Figure 5:
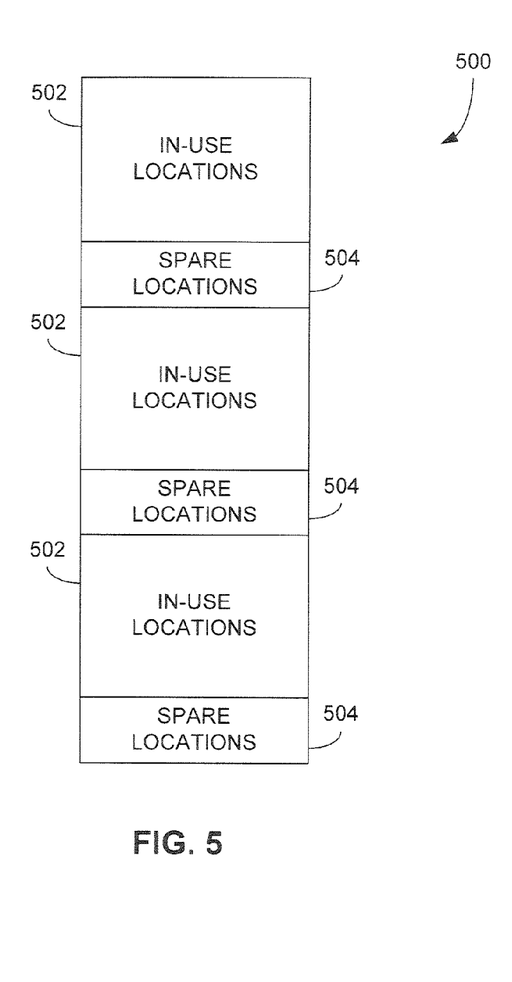
FIG. 5 is a graphical representation of a memory space including both in-use locations and spare locations according to an embodiment of the invention.

In the method 400, the firmware allocates portions of the memory addressable memory space of the semiconductor memory 310 as "in-use" or operational memory space, and allocates other portions of the address space as spare memory space (operation 402). In one embodiment, the "in-use" memory space is reported as available for normal system operation to an operating system (OS), such as Windows, Unix, or Linux, executing on the processor 360 during the operating system boot process. In one embodiment, the amount of in-use memory space may be reported as a number of memory "pages" recognizable by the operating system. The firmware does not report the spare memory space to the operating system, thus keeping the spare memory space in reserve. FIG. 5 graphically depicts a memory address space 500 allocated as a number of contiguous regions of in-use memory space 502 interspersed with a number of contiguous regions of spare memory space 504. Other embodiments may employ greater or fewer numbers of each of the in-use and spare memory space regions.

In one embodiment, the firmware may determine the total amount of the spare memory locations, as well as the size of each region of the spare memory space, based on the types and numbers of memory defects expected to be handled by the semiconductor memory system 300. Generally, the type of memory defect determines its scope, such as the size of the memory space affected, or the number of cache lines affected. For example, a single defective memory cell in one of the DRAMs 316 would likely affect a single cache line. On the other hand, a memory defect affecting a single row or column of one bank of a DRAM 316 may adversely affect hundreds or thousands of cache lines, requiring a corresponding amount of spare memory space. Further, defects involving multiple cells, rows or columns may similarly require spare areas of corresponding size.

In one embodiment, a single spare region of several cache lines may suffice to handle several single-cell memory defects. If, instead, a single row failure of a DRAM 316 having 11 column address bits, or 2K columns per row (where 1K=1024), a spare memory space of several hundred or a few thousand cache lines may be required to effectively replace several such failures. Similarly, a single column failure of a DRAM 316 having 15 row address bits, resulting in 32K rows, could require spare memory space of many thousands of cache lines. However, in a total memory space approaching a terabyte (TB), allocating even several megabytes of the total memory space to the spare memory space would represent a capacity overhead cost of much less than one percent. As indicated in FIG. 5, multiple spare regions may be allocated, with each of these spare regions being located on different rows of the DRAMs 316. Such allocation may help prevent a single memory row defect in the semiconductor memory 310 from rendering most or all of the spare memory regions worthless.

After the in-use and spare memory locations have been allocated, and the operating system has booted up to begin normal operations, the firmware in the firmware memory 370 that is executed by the processor 360 may monitor the in-use memory locations for data errors that have been detected and/or corrected (operation 404 of FIG. 4). In one embodiment, this operation may be performed in an ongoing manner during normal memory read and write operations performed in the system 300. The monitoring may also be performed in conjunction with specific diagnostic activities performed on the semiconductor memory 310 by the firmware. Further, the firmware may log each of the in-use memory locations associated with one of the detected/corrected errors (operation 406).

The firmware may process the logged in-use locations on an ongoing basis to identify each set of the in-use memory space affected by a memory defect (operation 408). Since each memory defect may affect different numbers of in-use locations, each set of the in-use memory space may be sized to closely correspond with the number of in-use locations affected by the associated defect. In one embodiment, the number of sets may only be limited by the amount of spare memory space allocated. Also in one embodiment, the size of each set may be anything from a single memory location to several million locations depending on the specific defect mechanism being managed. In one implementation, the firmware employs a simple heuristic to compare the various locations of the errors to known DRAM failure mechanisms to determine a location and scope of affected in-use locations caused by a defect. For example, if multiple data errors are detected within a single column of a particular rank 314 and bank of a DRAM 316, a single row-level defect may be presumed to affect the entire column. Similarly, if multiple data errors appear within a single row of a specific rank 314 and bank of a DRAM 316, the entire identified row may be defective. Detected faulty cells that seem to produce no such commonality may instead be viewed merely as individual faulty or "weak" cells that require replacement. Other known failure mechanisms identified with the DRAMs 316 or the DIMMs 312 may also be employed to determine the location and scope of each set of in-use locations associated with a particular memory defect.

Figure 6:
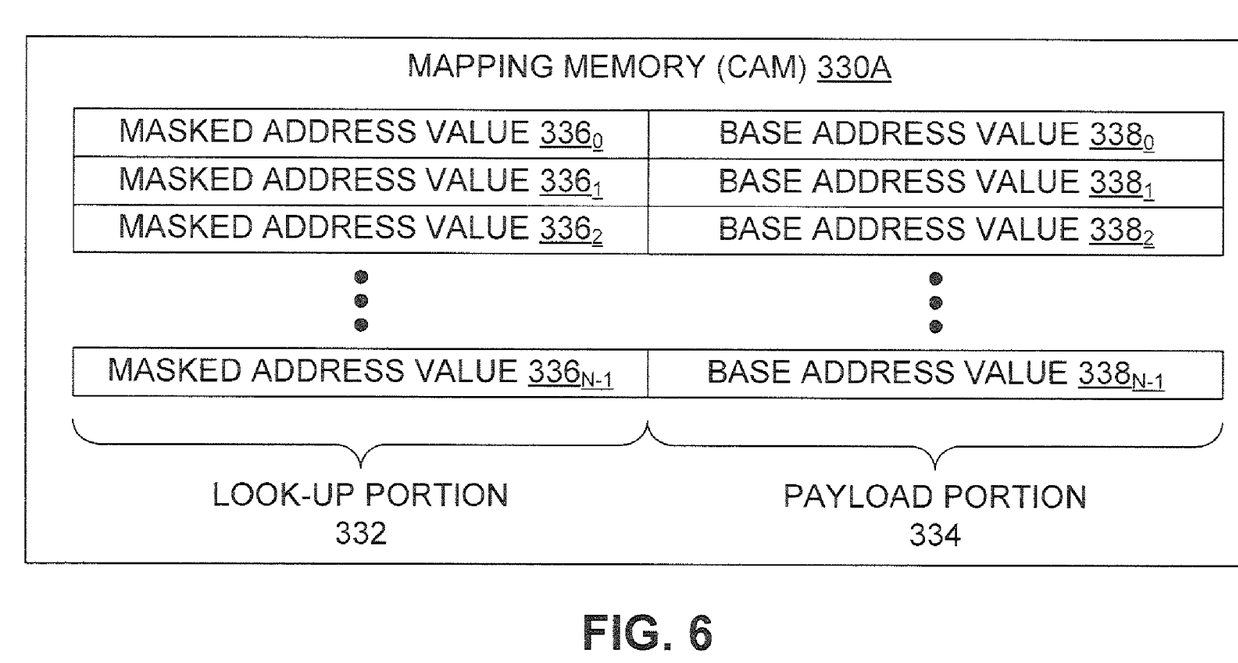
FIG. 6 is a block diagram of a mapping memory from the semiconductor memory system of FIG. 3 according to an embodiment of the invention.

Upon the firmware identifying one or more of the sets of the in-use locations that are identified with memory defects, the firmware may communicate with the control logic 320 of the memory controller 340 to associate each of the defective sets of the in-use locations with a corresponding set of the spare memory space (operation 410). In one embodiment, the corresponding set of the spare memory may be equal to or larger than the defective set. To accomplish this task, the control logic 320 utilizes the mapping memory 330 of FIG. 3 to store a data structure representing the associations between the in-use and spare memory sets. A more detailed view of one embodiment of a mapping memory 330A is provided in FIG. 6. The mapping memory 330A may be configured as a content-addressable memory (CAM) including a look-up portion 332 and a payload portion 334. More specifically, the look-up portion 332 includes storage for a number N of masked address values $336_0$-$336_{N-1}$, while the payload portion 334 includes a base address value $338_0$-$338_{N-1}$ corresponding to each of the masked address values $336_0$-$336_{N-1}$.

Figure 7:
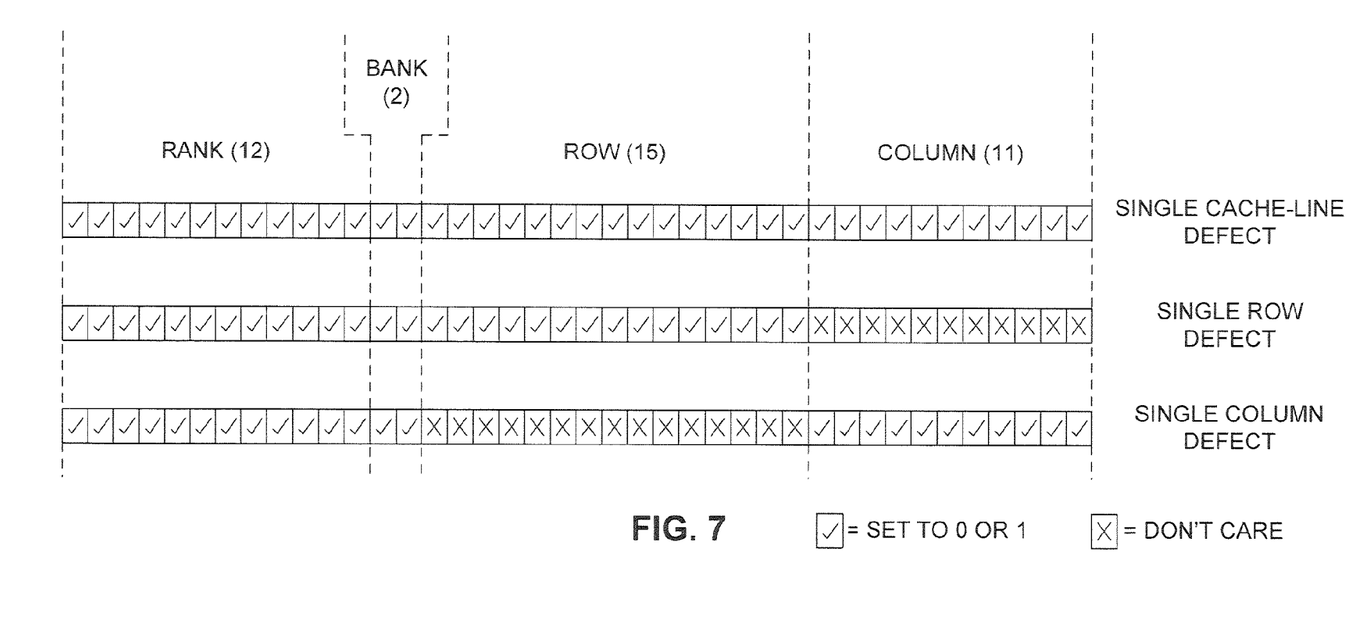
FIG. 7 is a graphical representation of some examples of significant bits employed in masked address values stored in the mapping memory of FIG. 6 according to an embodiment of the invention.

For each set of the in-use locations identified with a memory defect, the control logic 320 stores a masked address value 336 indicating both the location and scope of that set. To allow a single masked address value 336 entry of the mapping memory 330A to indicate both the location and extent of one of the in-use sets, the mapping memory 330A allows the use of "don't care" selections in each of the bit locations of each masked address value 336. More specifically, a "don't care" will match a bit of either 1 or 0 in a bitwise comparison. FIG. 7 provides some examples of how these "don't care" bits may be employed for some types of memory defects. The cache-line address format shown presumes a cache-line address of 40 bits in length. The cache-line address is divided into 12 bits indicating one of the ranks 314, 2 bits denoting one of four banks within a rank 314, 15 bits indicating a row within a bank, and 11 bits indicating a column with the bank. For a single-cell defect affecting a single cache-line, each bit the entire cache-line address may be specified as the masked address value 336 for the set of in-use locations affected, as indicated by the checkmarks shown for each address bit. Accordingly, no "don't care" bits (each of which would be indicated by an "X" in FIG. 7) are employed for identifying single cache-line addresses. If the firmware determines that a memory defect affects an entire row, the set of in-use locations affected may be specified by the rank, bank and row address bits of one of the affected cache lines, with all of the column address bits marked as "don't care." Similarly, a set of in-use locations covering a particular column may be designating by setting the rank, bank and column bits of the address to that of one of the affected cache lines, and setting all of the row address bits as "don't cares." As is explained in greater detail below, the "don't cares" represent the implementation of an address mask, thus preventing those particular address bits from being considered when determining if an incoming data request is to be directed to its original address or to a new address in the spare memory area.

In one embodiment, a set of the in-use locations may not necessarily occupy a single continuous region of the addressable memory space. For example, a defective column typically appears in the addressable space as a single defective location once every row. However, such a noncontiguous set of in-use locations may be replaced by a contiguous set of spare locations to allow more efficient use of the spare memory allocated.

When the firmware sets one of the masked address values 336 in the mapping memory 330A for a particular set of the in-use locations to be spared out, the firmware may also select a corresponding set of the spare memory space to which accesses to the set of the in-use locations is to be directed. The set may be indicated by way of setting the corresponding base address value 338 of the first cache-line address for the set of spare locations to be used. In one embodiment, the firmware may choose a set of the spare memory space that does not share the same rank, bank, row or column as the affected in-use locations. For example, a defective DRAM row may be redirected to a different row within the same rank 316 and bank, or any row of a different rank 316 or bank. The firmware may consider similar restrictions for other types of defects, such as single column failures.

Once a set of the in-use locations is identified and associated with a set of the spare locations, the firmware may interoperate with the memory controller 340 to initiate a copy of the data within the in-use set to that of the corresponding spare set (operation 412). Typically, this copy operation, described in greater detail below, is performed concurrently with normal data operations. As a result, the memory controller 340 keeps track of which data within the in-use set have already been copied over to the spare set so that the proper copy of the data requested is utilized.

Figure 8:
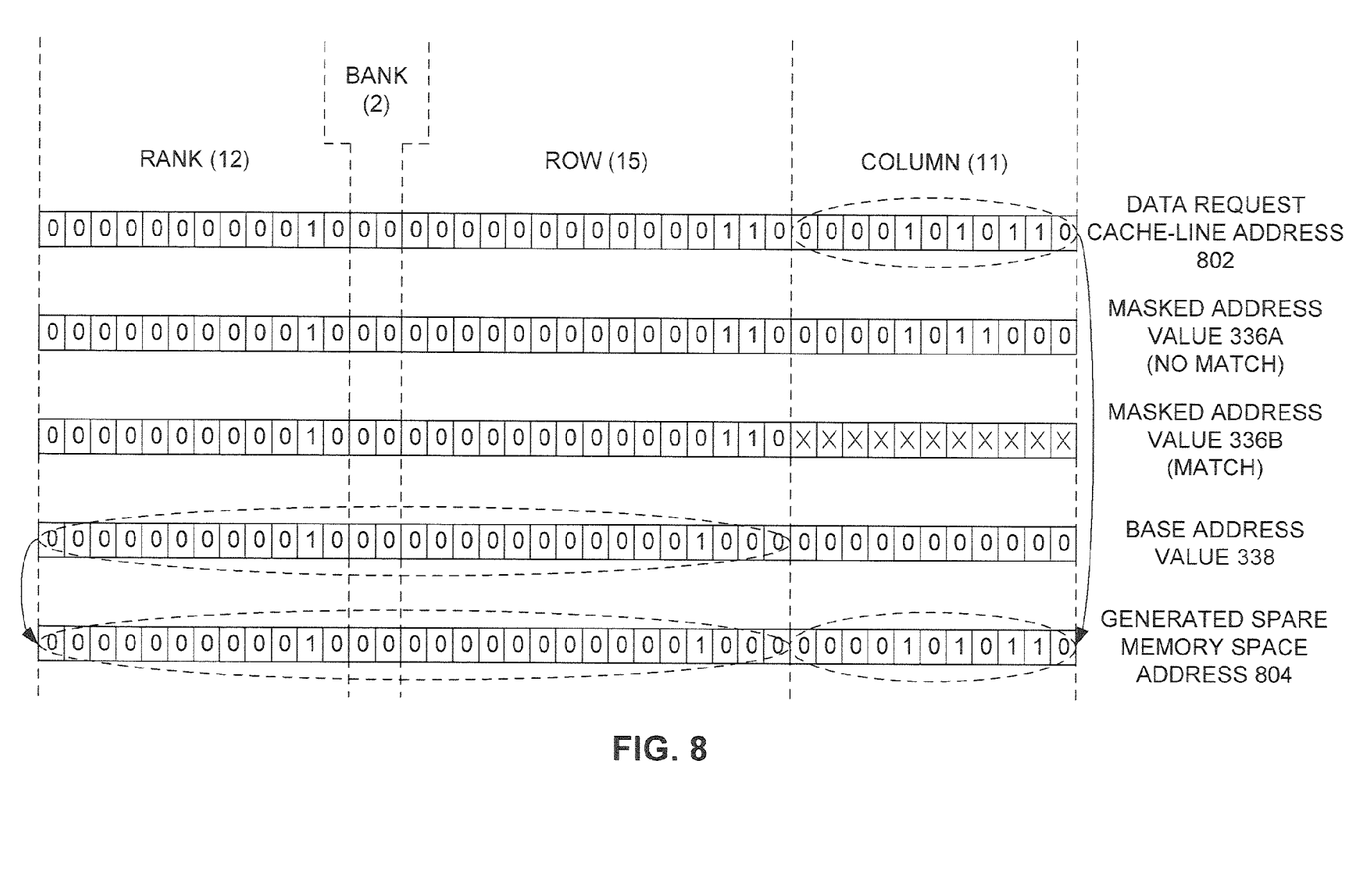
FIG. 8 is a graphical representation of an example of a comparison between a data request cache-line address and a masked address value to determine if the data request should be directed to a spare memory space in one embodiment of the invention.

During normal operation, while satisfying data requests from one or more processors 360, the memory controller 340, by way of the control logic 320, may employ the mapping memory 330A to compare the cache-line address of each of the data requests with each of the masked address values 336 to determine if the request should be redirected to the spare memory area (operation 414). More specifically, the mapping memory 330A compares the cache-line address of the data request with each of the bits of each masked address value 336, excluding the "don't care" bits. FIG. 8 illustrates one example of a data request that is directed to a hexadecimal cache-line address 802 of 0020003056H, corresponding to rank 2, bank 0, row 6, column 56H. Such an address would not match a masked address value 336A of 0020003058H for a single-cell memory defect, which does not specify any "don't cares." If no match is found between the cache-line address associated with the data access and any of the masked address values 336 (operation 416), the memory controller 340 uses the cache-line address value as is to access the data in either the cache memory 350 or the semiconductor memory 310 (operation 418).

If, instead, a match is found with one of the masked address values 336 (operation 416), the memory controller 340 combines the base address value 338 corresponding to the matched masked address value 336 with a masked address of the data request to generate an address within the set of spare locations to which the data access is directed (operation 420). FIG. 8 illustrates such a match with a masked address value 336B associated with a row failure, which uses "don't cares" for the column address bits. As a result, a match occurs as long as the rank, bank and row address bits concur, as in the case of FIG. 8. In response to the match, the control logic 320 combines the column address bits of the cache-line address 802 of the data request with the rank, bank and row address bits of the appropriate base address value 338B (also shown in FIG. 8) to generate the new cache-line address 804 for directing the data request to the spare memory space.

As mentioned above, to ensure coherency between the data previously stored at the set of in-use locations associated with a defect and the data stored in the corresponding set of spare locations, the firmware may interoperate with the memory controller 340 to copy each of the affected in-use locations to its corresponding location in the spare area (operation 412). In one embodiment, the control logic 320 of the memory controller 340 copies the locations in cache-line address order, keeping track of the progress of the copy operation by maintaining a pointer indicating the current in-use location being copied to the spare memory space. Accordingly, data request cache-line addresses falling below the pointer are redirected to the spare memory space, as discussed above. Those requests at the pointer or higher in the address space are directed unconditionally to the original in-use locations, as the data at those locations have not yet been copied to the spare memory space. Once the copy of the in-use set is complete, the memory controller 340, by way of the control logic 320, applies the mapping memory 330 to all of the set of in-use locations associated with the memory defect.

As mentioned earlier, a set of the in-use locations marked for replacement may be noncontiguous, such as in the case of a defective column. Under these circumstances, the defective column may be mapped to a contiguous set of the spare memory locations. As a result, the set of spare locations may also include one or more locations within the same defective column. To manage this possibility, a second mapping memory 332, as shown in FIG. 3, may be employed to remap those locations within the spare set that are located within the defective column to a second spare set that does not include spare locations within the defective column. Other noncontiguous sets of in-use locations aside from columns may be remapped in a similar fashion. In one particular example, the second mapping memory 332 may be a second CAM. More generally, a number of mapping memories, such as a multiple-stage CAM, may be implemented to ensure that each of the ultimate spare memory locations utilized is defect-free.

While much of the preceding discussion distinguishes between operations performed by the firmware, the memory controller 340 and the control logic 320, the various operations performed may be apportioned to these components differently in other embodiments. Further, the firmware, memory controller 340 and the control logic 320 may be collectively referred as "control logic" in the claims presented below.

Also, while much of the discussion above focuses specifically on single cell, single column and single row defects, other defect mechanisms, such as those affecting multiple cells, columns and rows, may be addressed in a similar fashion in other embodiments. Moreover, defects affecting one or more banks or ranks may be handled by extension of the concepts presented herein. In still other embodiments, other error correction schemes, such as the EDC and chipkill algorithms noted above, may be used in conjunction with the sparing techniques explicated herein to provide an enhanced solution.

Various embodiments of the invention discussed above may provide any of a number of advantages. For one, memory defects of varying scope may be addressed in a flexible manner by employing appropriately-sized spare memory sets corresponding to the affected set of in-use locations. Also, the more common types of memory defects, such as those affecting single DRAM cells, rows and columns, would typically require allocation of less than one percent of the total memory space for spare memory space, as noted earlier. The additional control logic and mapping memory presented herein typically requires little chip area compared to the remainder of the associated memory controller. By implementing these various embodiments, memory defects may be addressed and remedied quickly, thus possibly reducing the chance of multiple defects causing a catastrophic computer system failure. Also, by employing spare memory areas, the frequency at which memory, such as DRAM-based DIMMs, requires replacement may be reduced as well.

While several embodiments of the invention have been discussed herein, other embodiments encompassed by the scope of the invention are possible. For example, while some embodiments of the invention as described above are specifically employed using DRAMs and DIMMs, other memory technologies and organizations, such as SRAMs and SIMMs, may be employed while benefiting from the various aspects of the invention. Also, while the memory systems disclosed are described within the environment of a computer system, such memory systems may be employed within many types of systems requiring memory, such as special-purpose processing systems and embedded processor-based systems. Further, aspects of various embodiments may be combined to create further implementations of the present invention. Thus, while the present invention has been described in the context of specific embodiments, such descriptions are provided for illustration and not limitation. Accordingly, the proper scope of the present invention is delimited only by the following claims.

What is claimed is:

1. A method for managing defects in a semiconductor memory system having a plurality of addressable locations, the method comprising:
    allocating a first plurality of the addressable locations as in-use locations and a second plurality of the addressable locations as spare locations;
    determining, among the in-use locations, a number of sets of the in-use locations, wherein the sets of the in-use locations are associated with a memory defect, and wherein at least one of the sets of the in-use locations comprises a different number of the in-use locations than another one of the sets of the in-use locations;
    associating each of the sets of the in-use locations with at least one corresponding set of the spare locations; and
    directing each of a plurality of data requests that is associated with one of the sets of the in-use locations to the at least one corresponding set of the spare locations,
    in which determining a number of sets of the in-use locations comprises:
        monitoring the in-use locations for data errors;
        logging each of the in-use locations associated with at least one of the data errors; and
        processing the logged in-use locations to identify the sets of the in-use locations.

2. The method of claim 1, further comprising:
    copying data from each of the sets of the in-use locations to the at least one corresponding set of the spare locations.

3. The method of claim 1, wherein at least one of the sets of the in-use locations is associated with a physical organization of the semiconductor memory system.

4. The method of claim 1, wherein:
    the semiconductor memory system comprises at least one memory module comprising a plurality of dynamic random access memory devices; and
    at least one of the sets of the in-use locations comprises one of a rank of the memory module, a bank of one of the dynamic random access devices, a row of one of the dynamic random access devices, a column of one of the dynamic random access devices, and an addressable location of one of the dynamic random access devices.

5. The method of claim 1, wherein directing each of the plurality of data requests that is associated with the one of the sets of the in-use locations to the at least one corresponding set of the spare locations comprises:
    comparing an address of each of the data requests against first masked address values, wherein each of the first masked address values represents one of the sets of the in-use locations;
    for each of the addresses that corresponds with one of the first masked address values, directing the associated data request to an address of the one of the sets of the spare locations corresponding to the set of the in-use locations represented by the one of the first masked address values; and
    for each of the addresses that does not correspond with any of the first masked address values, directing the associated data request to the address of the associated data request.

6. The method of claim 5, wherein directing the associated data request to the address of the one of the sets of the spare locations comprises combining a base address value of the one of the sets of the in-use locations with a masked value of the address of the data request.

7. The method of claim 5, wherein directing each of the plurality of data requests that is associated with the one of the sets of the in-use locations to the at least one corresponding set of the spare locations further comprises:
    comparing the address of the one of the sets of the spare locations against second masked address values, wherein each of the second masked address values represents the one of the sets of the spare locations;
    for each of the addresses that corresponds with one of the second masked address values, directing the associated data request to an address of another one of the sets of the spare locations corresponding to the one of the sets of the spare locations represented by the one of the second masked address values; and
    for each of the addresses that does not correspond with any of the second masked address values, directing the associated data request to the address of the one of the sets of the spare locations.

8. The method of claim 1, wherein the in-use locations are available for use by way of an operating system.

9. A semiconductor memory system, comprising:
    a semiconductor memory comprising a plurality of addressable locations; and
    control logic configured to:
        allocate a first plurality of the addressable locations as in-use locations and a second plurality of the addressable locations as spare locations;
        determine, among the in-use locations, a plurality of sets of the in-use locations, wherein the sets of the in-use locations are associated with a memory defect, and wherein at least one of the sets of the in-use locations comprises a different number of the in-use locations than another one of the sets of the in-use locations;
        associate each of the sets of the in-use locations with at least one corresponding set of the spare locations; and
        direct each of a plurality of data requests that is associated with one of the sets of the in-use locations to the at least one corresponding set of the spare locations,
    in which the control logic:
        monitors the in-use locations for data errors;
        logs each of the in-use locations associated with at least one of the data errors; and
        processes the logged in-use locations to identify the sets of the in-use locations.

10. The semiconductor memory system of claim 9, wherein the control logic is further configured to copy data from each of the sets of the in-use locations to the at least one corresponding set of the spare locations.

11. The semiconductor memory system of claim 9, wherein at least one of the sets of the in-use locations is associated with a physical organization of the semiconductor memory.

12. The semiconductor memory system of claim 9, wherein:
the semiconductor memory comprises at least one memory module comprising a plurality of dynamic random access memory devices; and
at least one of the sets of the in-use locations comprises one of a rank of the memory module, a bank of one of the dynamic random access devices, a row of one of the dynamic random access devices, a column of one of the dynamic random access devices, and an addressable location of one of the dynamic random access devices.

13. The semiconductor memory system of claim 9, wherein:
the semiconductor memory system further comprises a mapping memory; and
the control logic is further configured to store a data structure within the mapping memory that associates each of the sets of the in-use locations with the at least one corresponding set of the spare locations.

14. The semiconductor memory system of claim 13, wherein:
the semiconductor memory system further comprises a second mapping memory; and
the control logic is further configured to store a second data structure within the second mapping memory that associates at least one of the sets of the spare locations with another one of the sets of the spare locations.

15. The semiconductor memory system of claim 13, further comprising a memory controller comprising the control logic and the mapping memory.

16. The semiconductor memory system of claim 13, further comprising a memory controller comprising the control logic, wherein the mapping memory is coupled with, and is physically separate from, the memory controller.

17. The semiconductor memory system of claim 13, wherein:
the data structure comprises a plurality of entries, wherein each entry comprises:
a masked address value representing one of the sets of the in-use locations; and
a base address value of one of the sets of the spare locations corresponding to the one of the sets of the in-use locations.

18. The semiconductor memory system of claim 17, wherein:
the mapping memory comprises a content-addressable memory comprising:
a look-up portion comprising the masked address value for each of the sets of the in-use locations; and
a payload portion comprising the base address value for each of the sets of the spare locations.

19. The semiconductor memory system of claim 17, wherein the control logic is further configured to:
compare an address of each of the data requests against the masked address values;
for each of the addresses that corresponds with one of the masked address values, direct the associated data request to one of the sets of the spare locations by way of the base address value corresponding to the one of the masked address values; and
for each of the addresses that does not correspond with any of the masked address values, direct the associated data request to the address of the associated data request.

20. The semiconductor memory system of claim 19, wherein the control logic is further configured to direct the data request to the one of the sets of the spare locations by combining the base address value corresponding to the one of the masked address values with a masked value of the address of the data request.

21. The semiconductor memory system of claim 9, wherein the in-use locations are available for use by way of an operating system.

22. A semiconductor memory system, comprising:
a semiconductor memory comprising a plurality of addressable locations;
means for allocating a first plurality of the addressable locations as in-use locations and a second plurality of the addressable locations as spare locations;
means for determining, among the in-use locations, a number of sets of the in-use locations, wherein the sets of the in-use locations are associated with a memory defect and at least one of the sets of the in-use locations comprises a different number of the in-use locations than another one of the sets of the in-use locations, and associating each of the sets of the in-use locations with at least one corresponding set of the spare locations; and
means for directing each of a plurality of data requests that is associated with one of the sets of the in-use locations to the at least one corresponding set of the spare locations,
in which the means for determining a number of sets of the in-use locations:
monitors the in-use locations for data errors;
logs each of the in-use locations associated with at least one of the data errors; and
processes the logged in-use locations to identify the sets of the in-use locations.

* * * * *